R. T. SKIPWORTH.
NUT LOCK.
APPLICATION FILED JAN. 15, 1920.

1,337,164.  
Patented Apr. 13, 1920.

Inventor  
Richmond T. Skipworth  
Franklin H. Hough  
By Attorney

UNITED STATES PATENT OFFICE.

RICHMOND TERRELL SKIPWORTH, OF UTICA, MISSISSIPPI.

NUT-LOCK.

1,337,164. Specification of Letters Patent. Patented Apr. 13, 1920.

Application filed January 15, 1920. Serial No. 351,590.

*To all whom it may concern:*

Be it known that I, RICHMOND T. SKIPWORTH, a citizen of the United States, residing at Utica, in the county of Hinds and State of Mississippi, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in nut locks, and comprises a simple and efficient device of this nature having various details of construction, combination and arrangement of parts which will be hereinafter fully described, shown in the accompanying drawings and then specifically defined in the appended claim.

I illustrate my invention in the accompanying drawings in which.

Reference now being had to the details of the drawings by letter:

A designates a bolt which, for a portion of its length, is substantially square in cross section with rounded corners having threads or serrations, transversely of said corners; that is to say, the bolt has longitudinally flattened faces A' connected by curved edges *a* having threads. The nut B, which should be thicker than ordinary nuts, in order to secure a better hold upon the threads of the bolt, is provided with a central threaded opening, as usual.

Figure 1:
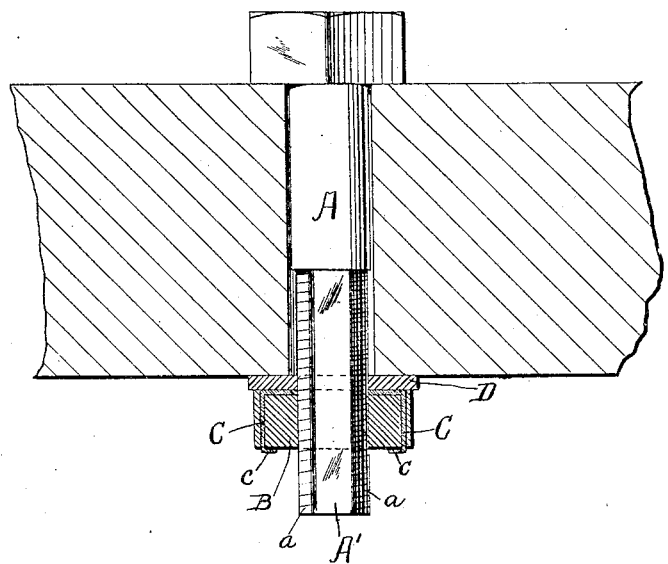
Figure 1 is an elevation of a bolt, with my nut lock, in section, thereon.
Figure 2:
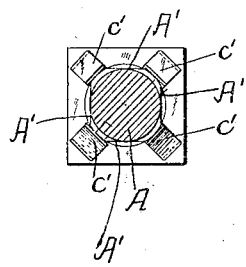
Fig. 2 is a transverse sectional view through a bolt, showing the position of the spring or prongs before they are bent into locking engagement with the bolt.
Figure 3:
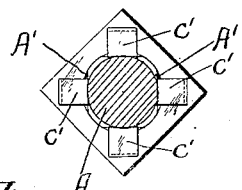
Fig. 3 is a similar view showing the spring prongs bent into locking position.
Figure 4:
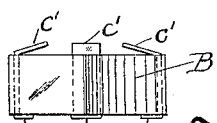
Fig. 4 is a view in side elevation of a nut provided with my locking means.

Carried by the nut B are nut-locking members C, preferably equal in number to the flat faces A' of the bolt, and formed of suitable material, such as ductile or spring metal. Said members C are strips which are passed through slots in the nut and have their rear edges C clenched over one of the faces of the latter and their opposite free ends C' normally inclined to the other face of the nut (see Fig. 4).

In operation, the nut B is positioned on the bolt A, and when the nut moves against the washer D, the inclined ends C' of the nut-locking members are automatically bent flat against the end face of the nut, and the free edges of the ends C' bear forcibly against the flat faces A' of the bolt A, thus locking the nut against rotation on the bolt.

If desired, of course, the nut may be positioned on the bolt in the reverse position to that just described, so that the clenched ends C bear against the washer D. In this case the fore-terminals C' of the nut-locking members would not be automatically bent into locking engagement with the flat faces A' of the bolt, but would have to be bent by a tool, or by hand.

What I claim to be new is:

The combination with a bolt having longitudinally extending flat faces, a nut adapted to be positioned on said bolt, and nut-locking members carried by said nut and comprising metallic strips passing through said nut, and having projecting terminals normally inclined to the end face of said nut and adapted to be bent into contact with said flat faces of the bolt.

In testimony whereof I hereunto affix my signature in presence of two witnesses.

RICHMOND TERRELL SKIPWORTH.

Witnesses:
   D. C. SIMMONS,
   J. S. ALLEN.